United States Patent
Sakaue

(10) Patent No.: US 7,708,523 B2
(45) Date of Patent: May 4, 2010

(54) WIND TURBINE BLADE ASSEMBLY AND METHOD OF INSTALLING THE SAME ON TOWER

(75) Inventor: Tatsuya Sakaue, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 634 days.

(21) Appl. No.: 11/596,125

(22) PCT Filed: May 6, 2005

(86) PCT No.: PCT/JP2005/008350

§ 371 (c)(1),
(2), (4) Date: Nov. 9, 2006

(87) PCT Pub. No.: WO2005/108786

PCT Pub. Date: Nov. 17, 2005

(65) Prior Publication Data

US 2008/0273986 A1    Nov. 6, 2008

(30) Foreign Application Priority Data

May 10, 2004    (JP) ............................. 2004-140136

(51) Int. Cl.
*B64C 11/04* (2006.01)
(52) U.S. Cl. ...................................... 416/1; 416/244 R
(58) Field of Classification Search ................. 415/4.3, 415/4.5; 416/244 R, 1; 290/45, 44
See application file for complete search history.

(56) References Cited

U.S. PATENT DOCUMENTS 7,207,777 B2 *  4/2007  Bervang ..................... 416/119

FOREIGN PATENT DOCUMENTS

| | | |
|---|---|---|
| DE | 197 41 988 A1 | 9/1997 |
| DE | 19741988 A1 | 4/1999 |
| EP | 1 239 150 A2 | 2/2002 |
| EP | 1239150 A | 9/2002 |
| EP | 1 350 953 A2 | 10/2003 |
| EP | 1350953 A2 | 10/2003 |
| JP | 09-124266 | 5/1997 |
| JP | 10-205428 | 8/1998 |
| JP | 10-205429 | 8/1998 |
| JP | 10-205430 | 8/1998 |
| JP | 11-82285 | 3/1999 |
| JP | 2002-147339 | 5/2002 |
| JP | 2002-147339 A | 5/2002 |

OTHER PUBLICATIONS

Office Action issued in a counterpart Korean application by the KIPO on Aug. 23, 2007, Japanese translation of Office Action and partial English translation of the opinion of the Korean Examiner, pp. 1-5.
Office Action from corresponding Japanese Application No. 2004-140136 with English translation.

* cited by examiner

*Primary Examiner*—Edward Look
*Assistant Examiner*—Dwayne J White
(74) *Attorney, Agent, or Firm*—Lowe Hauptman Ham & Berner, LLP

(57) ABSTRACT

In the aspect of the present invention, an installing a wind turbine is achieved by forming a blade assembly in which a plurality of blades are attached to a rotor head, by attaching a suspension structure to the rotor head, by lifting the blade assembly through the suspension structure by a first crane, and by installing the blade assembly to a nacelle of a wind turbine tower.

11 Claims, 7 Drawing Sheets

WIND TURBINE BLADE ASSEMBLY AND METHOD OF INSTALLING THE SAME ON TOWER

RELATED APPLICATIONS

The present application is based on International Application No. PCT/JP2005/008350, filed May 6, 2005, and claims priority from, Japanese Application No. 2004-140136, filed May 10, 2004, the disclosure of which is hereby incorporated by reference herein in its entirety.

TECHNICAL FIELD

The present invention relates to a wind turbine blade assembly and a method of installing the same.

BACKGROUND ART

Diversification of energy supply has been on progress. As one of the energy supply systems, wind turbine generation using natural energy has been known from ancient times. As wind turbines, vertical axis type wind turbines and horizontal axis wind turbines are known. Many of the vertical axis type wind turbines are small type wind turbines, in which a Darrieus type wind turbine and a straight blade vertical axis type wind turbine are known. In the horizontal axis wind turbines suitable for a large scale of power generation, a three-blade type wind turbine is a mainstream.

As the three-blade type wind turbine stated above, a large-sized wind turbine with the diameter of 60 m and more between a blade end and an opposite blade end in a rotation state is on a practical operation. A wind turbine power generation apparatus includes a wind turbine tower which is higher than the radius length of the blade, a nacelle rotatably installed at the top of the wind turbine tower, and a three-blade assembly rotatably installed to the nacelle. The three-blade assembly includes a rotor head rotatably supported by the nacelle, and three rotating blades installed to the rotor head in a pitch angle adjustable manner. When the three-blade assembly is installed to the nacelle, climbing cranes are employed for the wind turbine tower so that the wind turbine tower is built up from the ground to the height direction successively, as disclosed in Japanese Laid Open Patent Application (JP-A-Heisei 10-205429). The climbing cranes are also used for suspending the three blades.

The mass of the three-blade assembly exceeding 60 m is huge. It is important for suppression of the increase of the construction cost to suspend the three-blade assembly which was integrally assembled, rather than to suspend each one of the three blades. In the suspension of the three-blade assembly, suppression of the rotational movement around the center of gravity and installation of a rotation plane formed by the three blades on a substantially vertical plane are required in order to avoid damages caused by contacts between the three-blade assembly and the wind turbine tower and to provide operational safety.

A conventional construction method includes a manual operation for suspending a suspension technique such as a nylon sling to blades and a head in suspending the three-blade assembly by a crane. A slinging operation is conducted by a slinging skilled worker for sling work in a high place and a skilled work including an operation of adjusting the center of gravity. Accordingly, suspension to eliminate the skilled work as much as possible is required.

A construction method of a wind turbine power generation apparatus related to the above carried-out is disclosed in Japanese Laid Open Patent Application (JP-A-Heisei 10-205428). In this conventional example, the climbing crane is used. However blades are installed to the nacelle. Similar techniques are disclosed in Japanese Laid Open Patent Applications (JP-A-Heisei 10-205429, JP-A-Heisei 10-205430, and JP-A-Heisei 11-82285).

DISCLOSURE OF INVENTION

An object of the present invention is to provide a method for installing wind turbine blade assembly in which suspension can be realized while excluding the skilled work as much as possible, and to provide a wind turbine blade assembly therefor.

Another object of the present invention is to provide wind turbine blade assembly in which safety and high efficiency is realized, and an installing method thereof on a tower.

In an aspect of the present invention, a method of constructing a wind turbine, is achieved by forming a blade assembly in which a plurality of blades are attached to a rotor head; by attaching a suspension structure to the rotor head; by lifting the blade assembly through the suspension structure by a first crane; and by installing the blade assembly to a nacelle of a wind turbine tower.

Here, the attaching a suspension structure is achieved by attaching eye plates to the rotor head; and by fixing a suspension plate coupled with a suspension ring wire to the eye plates. Thus, the blade assembly can be suspended through the suspension ring wire by the first crane.

Also, when the plurality of blades are three blades, the attaching the eye plates to the rotor head may be achieved by sticking the eye plate to a portion of the rotor head on an opposite side to one of the three blades.

Also, the eye plates may have a plurality of protrusion sections with holes, respectively, and the suspension plate may have a hole corresponding to the holes. The fixing a suspension plate may be achieved by inserting a pin into the holes of the plurality of protrusion sections and the hole of the suspension plate; and by inserting a slip-off prevention pin into the pin.

Also, the lifting the blade assembly may be achieved by lifting the blade assembly through the suspension ring by the suspension tool of the first crane; and by lifting up an end of at least one of the plurality of blades by a second crane until the blade assembly is suspended to a predetermined height.

Also, the method may be achieved by further hanging cables to ones of the plurality of blades other than the blade whose end is suspended by the second crane; and pulling the cables.

Also, the pulling may be achieved by pulling the cables such that a rotation plane of the plurality of blades is inclined to have a predetermined angle with respect to a vertical plane. AT this time, the method may be achieved by further removing the suspension structure from the blade assembly after the blade assembly is installed to the nacelle of the wind turbine tower.

In another aspect of the present invention, a wind turbine structure includes a plurality of blades; a rotor header to which the plurality of blades are attached; and a suspension structure attached to the rotor header.

It is preferable that the suspension structure is detachable to the rotor header.

The suspension structure may include eye plates attached to the rotor header and having a plurality of protrusion sections with a plurality of holes, respectively; a suspension plate having a hole corresponding to the plurality of holes and fixed to the eye plates; a pin inserted into the plurality of holes of the plurality of protrusion sections and the hole of the suspension plate to fix the suspension plate and the eye plate; and the slip-off prevention pin inserted into the pin. In this case, the suspension structure may further include a suspension wire rotatably coupled with the suspension plate and used when the blade assembly is suspended.

Also, the eye plates are preferably installed to the rotor header such that a rotation plane of the plurality of blades is inclined by a predetermined angle from a vertical plane.

Also, when the plurality of blades are three blades, the eye plates are stuck to a portion of the rotor head on an opposite side to one of the three blades.

BEST MODE FOR CARRYING OUT THE INVENTION

Hereinafter, a wind turbine blade assembly of the present invention will be described in detail with reference to the attached drawings.

Figure 1:
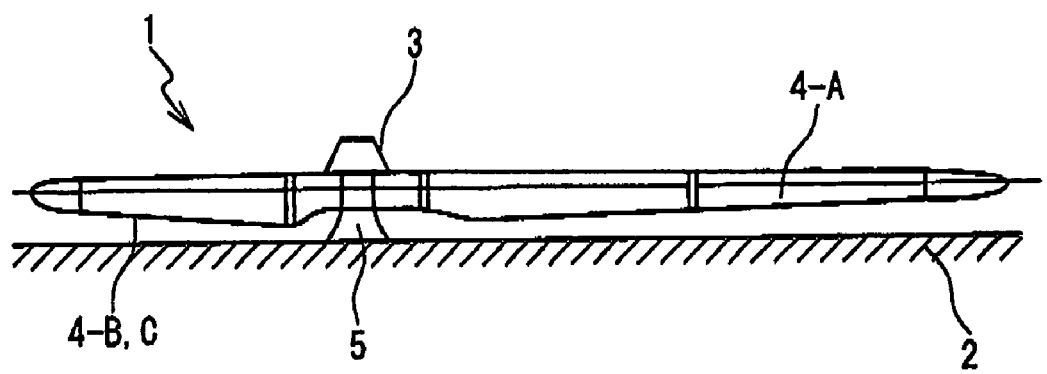
FIG. 1 is a diagram showing a three-blade assembly laid on a blade structure laid base.
Figure 2:
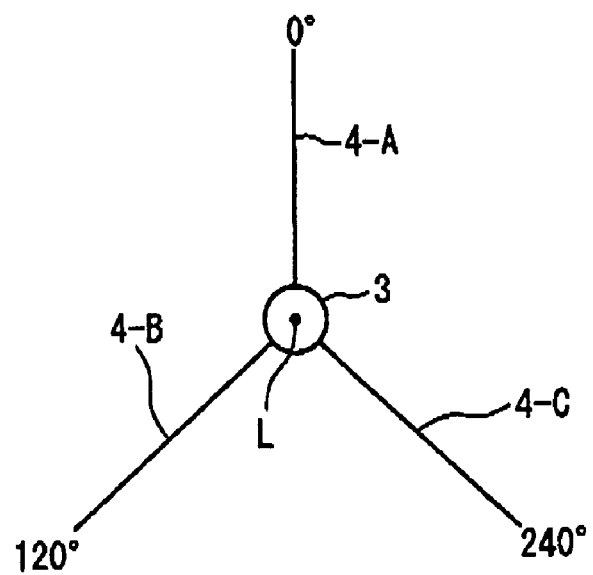
FIG. 2 is a front view showing a relationship of angular-positions of three blades.

FIG. 1 is a diagram showing a wind turbine blade assembly according to the first embodiment of the present invention. As shown in FIG. 1, a three-blade assembly 1 is laid on a three-blade assembly laid base 2 installed on a horizontal ground of a wind turbine installation place. The three-blade assembly 1 includes a rotor head 3 and three blades 4 (a first blade 4-A, a second blade 4-B and a third blade 4-C). The rotor head 3 and the three blades 4-A, 4-B and 4-C are integrally assembled on the three-blade assembly laid base 2 in advance. Base portions of the three blades are respectively disposed in three portions of the rotor head around the rotational axis so as to be pitch adjustable. The positions of these three base portions are shown as three angular positions of 0 degree, 120 degrees and 240 degrees with respect to a standard angular position (0 degree) around the rotational axis L as virtually shown in FIG. 2. A suspension structure to be described below is integrally attached to the rotor head 3 on the position of 180 degrees.

Figure 3:
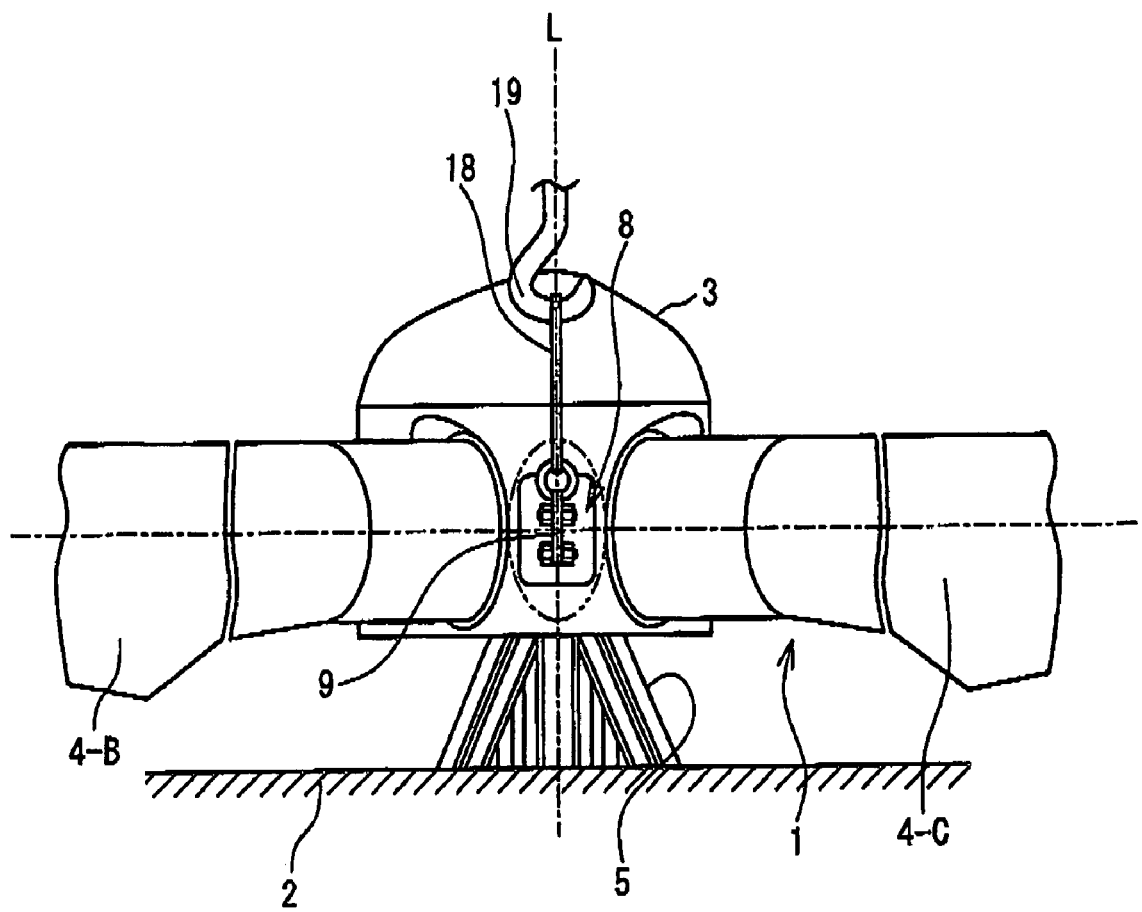
FIG. 3 is a front view showing a suspension structure installed to the three-blade assembly.
Figure 4:
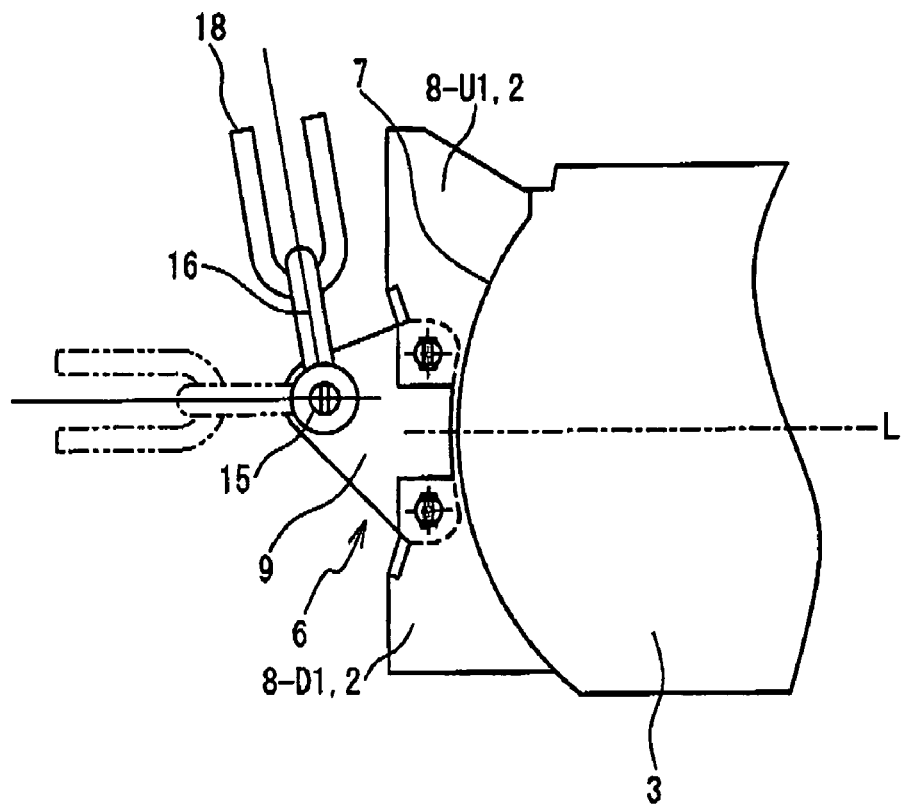
FIG. 4 is a side view of the suspension structure shown in FIG. 3.

FIG. 3 shows an initial assembly state in which the three-blade assembly 1 is laid on the three-blade assembly laid base 2 through a stabilizing stand 5. A suspension structure 6 as stated above is installed to the rotor head 3 on the angular position of 180 degrees which is a center angular position of an angular direction between the second blade 4-B on the angular position of 120 degrees and the third blade 4-C on the angular position of 240 degrees. The suspension structure 6 includes eye plates 8 fixed to the rotor head 3 and a suspension plate 9, in which the eye plates 8 are attached or stuck in an outer peripheral surface region 7 of the rotor head 3, as shown in FIG. 4. The eye plates 8 include first and second upstream side protruding portions 8-U1 and 8-U2, and first and second downstream side protruding portions 8-D1 and 8-D2.

Figure 5:
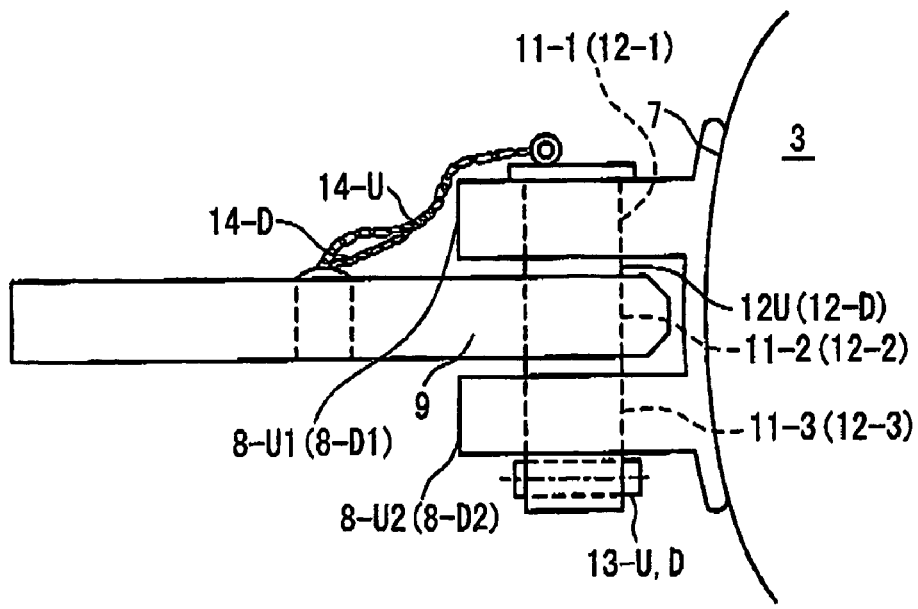
FIG. 5 is a top view of the suspension structure shown in FIG. 3.

As shown in FIG. 5, the suspension plate 9 is interposed between the first and second upstream side protruding portions 8-U1 and S-U2, and the first and second downstream side protruding portions 8-D1 and 8-D2. Pin holes 11-1, 11-2 and 11-3 are formed in corresponding positions of the first upstream side protruding portion 8-U1, the second upstream side protruding portion 8-U2 and the suspension plate 9. A pin 12-U is inserted to penetrate the three pin holes 11-1, 11-2 and 11-3 for fixing the suspension plate 9 to the eye plates 8. Pin holes 12-1, 12-2 and 12-3 are also formed in corresponding positions of the first downstream side protruding portion 8-D1, the second downstream side protruding portion 8-D2 and the suspension plate 9. A pin 12-D is inserted to penetrate the three pin holes 12-1, 12-2 and 12-3 for fixing the suspension plate 9 to the eye plates 8. The pins 12-U and 12-D do not slip off from upstream side eye plates 8-U and downstream side eye plate 8-D respectively by slip-off prevention pins 13-U1 and 13-D. The pins 12-U and 12-D are prevented from falling off from the suspension plate 9 by chains 14-U and 14-D.

A suspension fork 16 is rotatably connected to a suspension axis 15 of the suspension plate 9. An end portion of the suspension fork 16 is rotatably connected to the suspension axis 15, and a suspension ring wire 18 is passed through the suspension fork 16. As shown in FIG. 3, a suspension tool 19 from a crane (not shown) is passed through a ring section in an end portion of the suspension ring wire 18.

Figure 6:
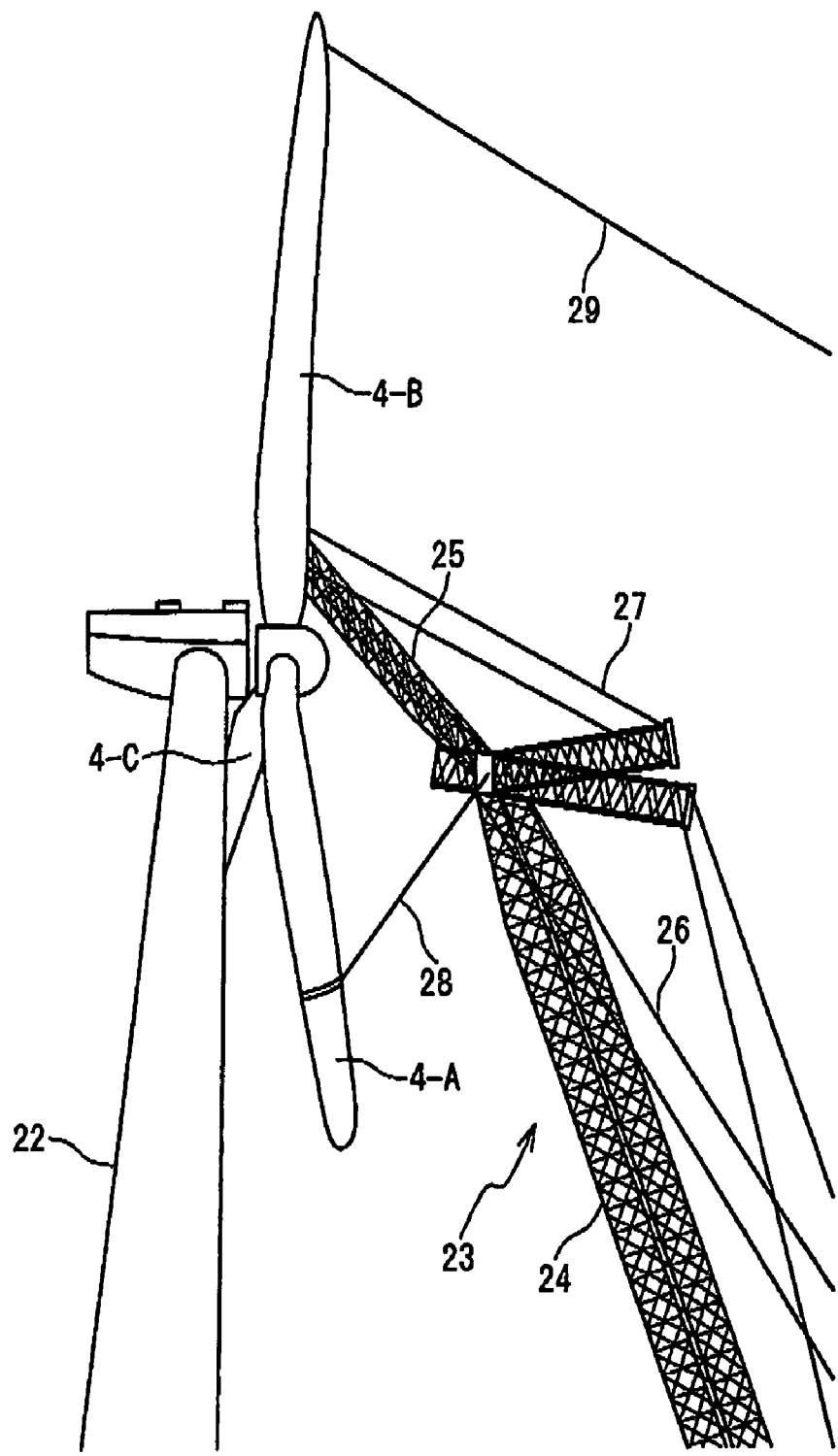
FIG. 6 is a diagram showing a method for installing a wind turbine blade assembly according to the present invention.

FIG. 6 shows a method for installing a wind turbine blade assembly according to the present invention. A crane 23 is disposed in the vicinity of a wind turbine tower 22. The crane 23 includes a first inclined crane section 24 and a second inclined crane section 25. An inclined angle of the first inclined crane section 24 is adjustably sustained by an inclined angle adjustment cable 26. An inclined angle of the second inclined crane section 25 from the first inclined crane section 24 is adjustably sustained by an inclined angle adjustment cable 27. The first blade 4-A is suspended by a first pulling cable 28 using the first inclined crane section 24, and the second blade 4-B is suspended from the ground by a second pulling cable 29. The third blade 4-C is preferably suspended from the ground by a third pulling cable 29 (see FIG. 7). The three blades 4-A, 4-B and 4-C are suspended by the three pulling cables in a substantially stable state.

Figure 7:
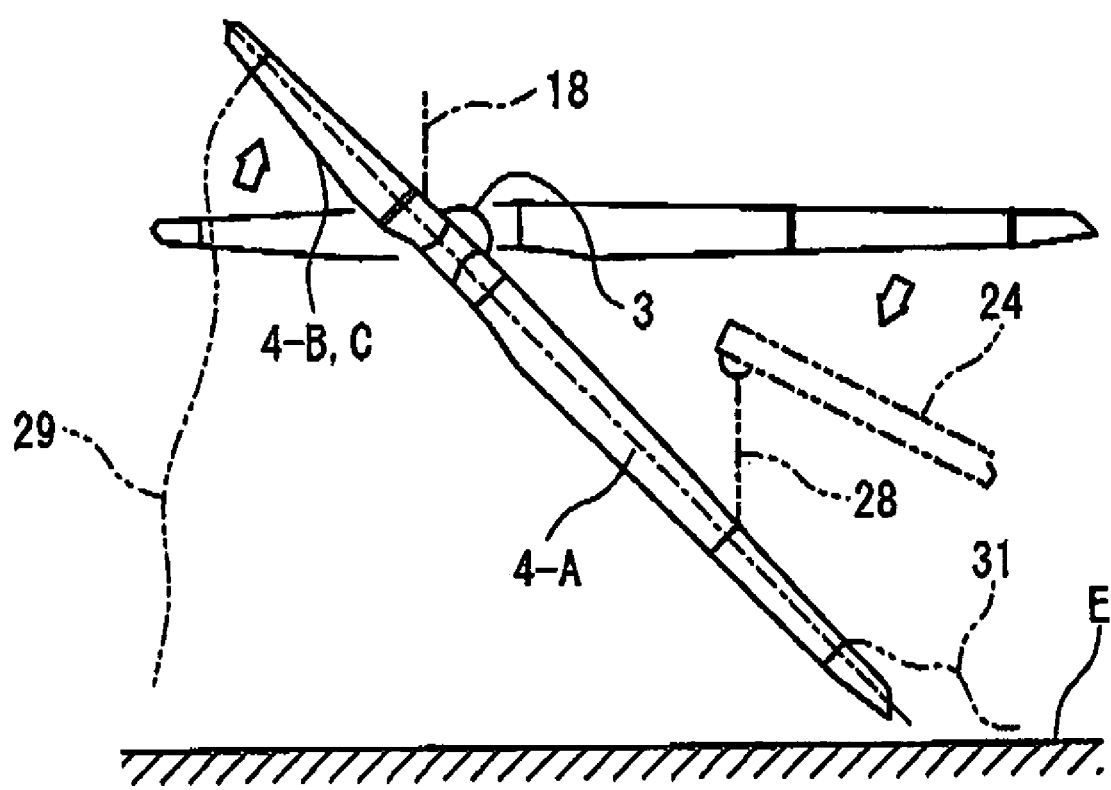
FIG. 7 is a diagram showing a first suspension stage in the method for installing the wind turbine blade assembly according to the present invention.
Figure 9:
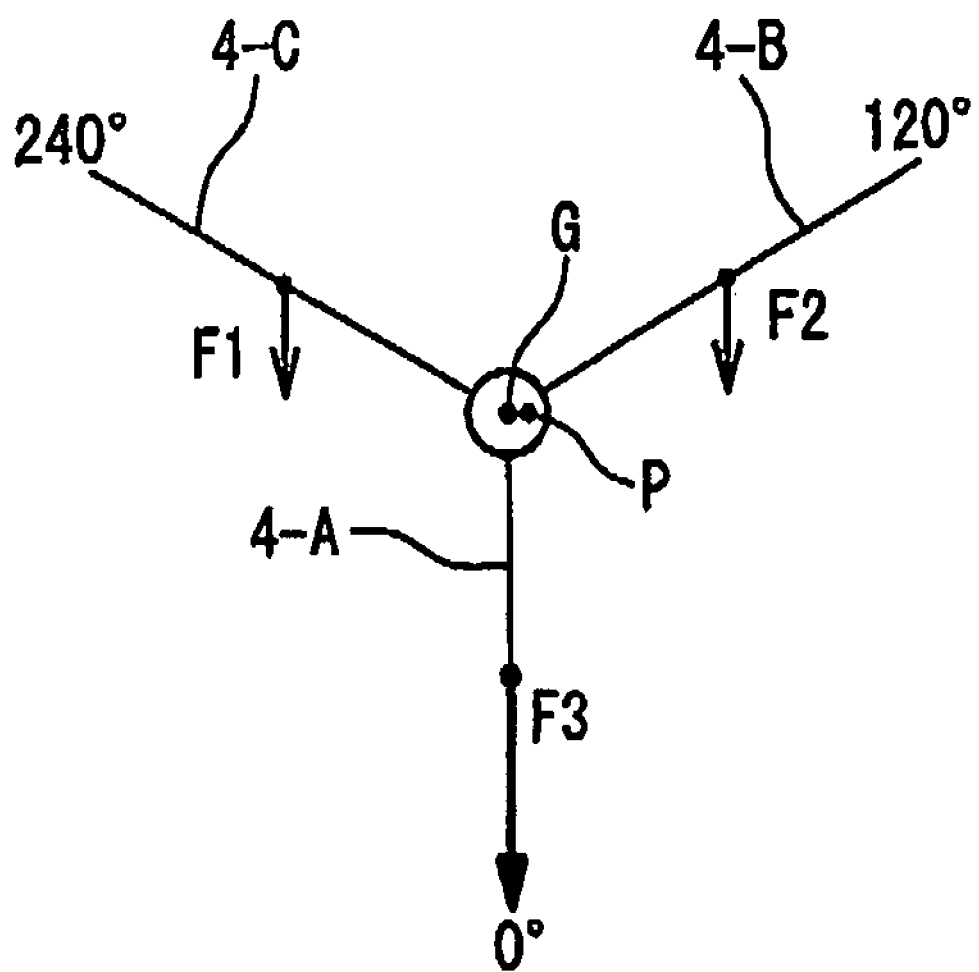
FIG. 9 is a diagram showing a gravity vector and the center of gravity which acts on three blades.

FIG. 7 shows a first suspension step. In a providing step of FIG. 1 which is a previous step to a step of FIG. 7, the three blades 4-A, 4-B and 4-C are sustained on the laid base 2 in a substantially horizontal state. The suspension structure 6 is suspended by the second inclined crane section 25 via the suspension ring wire 18. In this first suspension step, the suspension fork 16 slowly stands up toward the vertical direction from the horizontal direction as shown in FIG. 4, while the weight of the first blade 4-A which is not directed to the vertical direction provides the first blade 4-A with a rotational force around a suspension point P included in the suspension axis 15 as shown in FIG. 9. In the first suspension step in which the suspension point P is not suspended to a height position corresponding to the length of the first blade 4-A which is substantially equivalent to a rotational radius of the wind turbine blade assembly, a free end of the first blade 4-A is suspended by the first pulling cable 28 because of a danger of being in contact with the ground E. The further pulling force is preferably provided by another pulling cable 31. It is more preferable to provide both or either one of the second blades 4-B and 4-C with the pulling force by another pulling cable (not shown) to suppress the rotation or oscillation of the three-blade assembly as a whole.

Figure 8:
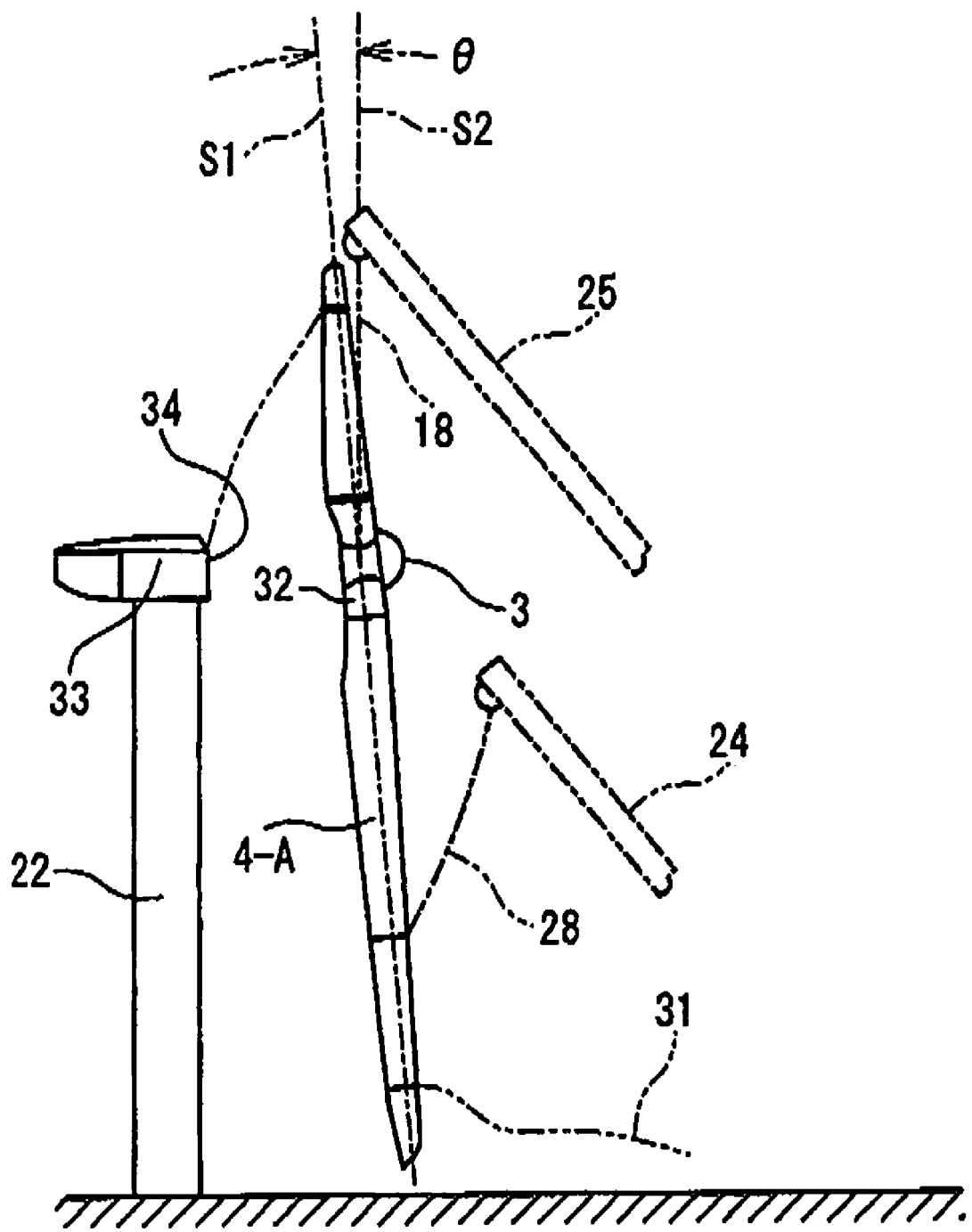
FIG. 8 is a diagram showing a second suspension stage in the method for installing the wind turbine blade assembly according to the present invention.

FIG. 8 shows a second suspension step. It is same as in the first suspension step in a point that the suspension structure 6 is suspended by the suspension tool 19. In this second suspension step, the suspension fork 16 stands up in the substantially vertical direction. An angle θ between a reference rotation plane S1 and a vertical plane S2 in the rotating blades can be designed to become substantially zero. The angle θ can be easily made to be zero by providing the first blade 4-A with the pulling force by using the third pulling cable 31 fixed to the vicinity of the free end of the first blade 4-A with manual power. The angle θ is designed to be an angle which is not zero and sustained during the installation, as described below. In the second suspension step, as shown in FIG. 9, a synthetic force (F1+F2) between a first gravity vector F1 acting on the third blade 4-C and a second gravity vector F2 acting on the second blade 4-B has the following relationship with respect to a third gravity vector F3 acting on the first blade 4-A.

$$2F3=F1+F2$$

The direction of the synthetic force (F1+F2) is equivalent to a direction of the third gravity vector F3, and the synthetic force among the first gravity vector F1, the second gravity vector F2 and the third gravity vector F3 acts on the center of gravity G of the three-blade assembly 1 as a whole. In such a balanced relationship, there is no rotation force generated in the three-blade assembly 1. In order to prevent the swinging of the three-blade assembly 1 caused by wind, the above cables 28 and 29 are appropriately used.

The inclined angle of the second inclined crane section 2 is further increased, and the top of the second inclined crane section 25 is further closely approached to the wind turbine tower 22, so that a downstream side attachment surface 32 of the rotor head 3 is coupled to an attachment surface 34 of the nacelle 33.

In a conventional sling operation, fastened cables are made asymmetrical even in the skilled work, and it takes long time for stabilization of a position of the center of gravity. Moreover, when the position of the center of gravity is stabilized and the rotational movement of the three blades is stopped, the angle θ between the reference rotation plane by the three blades and the vertical plane is increased due to the asymmetry. In order to decrease the angle θ, the skilled workers are forced to repeat the sling operations over and over again in a trial and error manner.

In the present invention, the positions of suspension points are defined by the suspension axis 15 so that a fulcrum of the suspension force acts as the rotation axis and no asymmetrical force is generated in the three-blade assembly 1 which receives the suspension force. The suspension structure 6 is simply assembled at a working spot only by insertion of the pins 12, and simply disassembled only by extraction of the pins 12. The eye plates 8 which are attachable and detachable to the rotor head 3 can also be simply removed.

The three-blade assembly 1 is thus installed to the nacelle 33 as an integrated object in a single suspending operation, and dismantled from the nacelle.

The attachment surface 34 is designed at a nacelle angle α with respect to the vertical plane. The above-mentioned angle θ is adjusted to be consistent with the nacelle angle α. The suspension point P is shifted to a slightly distant position from the nacelle 33 compared to the center of gravity G which is designed to be substantially consistent with the rotation axis as shown in FIG. 9. Through this design, the reference rotation plane S1 is sustained to be in parallel with the attachment plane 34. It is extremely difficult to bring the inclined angle θ of the reference rotation plane S1 of the blades 4 suspended by the crane to be consistent with the design angle α and to maintain the angle θ in a fixed state by the sling operation. However, according to the present invention, the reference rotation plane of the blades 4 as a large mass object is sustained in the design angle α naturally and autonomously without relying on a manual operation which is difficult due to the gravity.

According to the wind turbine blade assembly and the assembling method thereof in the present invention, an operational efficiency to install the wind turbine blade assembly of a large sized wind turbine to a nacelle on a tower of the wind turbine tower is significantly improved and the safety can be secured.

The invention claimed is:

1. A method of constructing a wind turbine, comprising:
   forming a blade assembly in which a plurality of blades are attached to a rotor head;
   attaching a suspension structure to said rotor head;
   lifting said blade assembly through said suspension structure by a first crane; and
   installing said blade assembly to a nacelle of a wind turbine tower,
   wherein said attaching a suspension structure comprises:
   attaching eye plates to said rotor head; and
   fixing a suspension plate coupled with a suspension ring wire to said eye plates, and said blade assembly is suspended through said suspension ring wire by said first crane;
   wherein said eye plates have a plurality of protrusion sections with holes, respectively, and said suspension plate has a hole corresponding to said holes, and
   said fixing a suspension plate comprises:
   inserting a pin into said holes of said plurality of protrusion sections and said hole of said suspension plate; and
   inserting a slip-off prevention pin into said pin.

2. The method according to claim 1, wherein said plurality of blades are three blades, and said attaching said eye plates to said rotor head comprises:
   sticking said eye plate to a portion of said rotor head on an opposite side to one of said three blades.

3. The method according to claim 1, wherein said lifting said blade assembly comprises:
   suspending said blade assembly through said suspension ring by said suspension tool of said first crane; and
   suspending an end of at least one of said plurality of blades by a second crane until said blade assembly is suspended to a predetermined height.

4. The method according to claim 1, further comprising:
   removing said suspension structure from said blade assembly after said blade assembly is installed to said nacelle of said wind turbine tower.

5. A method of constructing a wind turbine, comprising:
   forming a blade assembly in which a plurality of blades are attached to a rotor head;
   attaching a suspension structure to said rotor head;
   lifting said blade assembly through said suspension structure by a first crane;
   installing said blade assembly to a nacelle of a wind turbine tower;
   hanging cables to ones of said plurality of blades other than said blade whose end is suspended by said second crane; and pulling said cables, wherein said attaching a suspension structure comprises:

attaching eye plates to said rotor head; and fixing a suspension plate coupled with a suspension ring wire to said eye plates, and said blade assembly is suspended through said suspension ring wire by said first crane, wherein said lifting said blade assembly comprises:

suspending said blade assembly through said suspension ring by said suspension tool of said first crane; and suspending an end of at least one of said plurality of blades by a second crane until said blade assembly is suspended to a predetermined height.

6. The method accordingly to claim 5, wherein said pulling comprises:

pulling said cables such that a rotation plane of said plurality of blades is inclined to have a predetermined angle with respect to a vertical plane.

7. A wind turbine structure comprising:

a plurality of blades;

a rotor header to which said plurality of blades are attached; and a suspension structure attached to said rotor header, wherein said suspension structure comprises:

eye plates attached to said rotor header and having a plurality of protrusion sections with a plurality of holes, respectively;

a suspension plate having a hole corresponding to said plurality of holes and fixed to said eye plates;

a pin inserted into said plurality of holes of said plurality of protrusion sections and said hole of said suspension plate to fix said suspension plate and said eye plate; and a slip-off prevention pin inserted into said pin.

8. The wind turbine structure according to claim 7, wherein said suspension structure is detachable to said rotor header.

9. The wind turbine structure according to claim 7, wherein said suspension structure further comprises:

a suspension wire rotatably coupled with said suspension plate and used when said blade assembly is suspended.

10. The wind turbine structure according to claim 7, wherein said eye plates are installed to said rotor header such that a rotation plane of said plurality of blades is inclined by a predetermined angle from a vertical plane.

11. The wind turbine structure according to claim 10, wherein said plurality of blades are three blades, and said eye plates are stuck to a portion of said rotor head on an opposite side to one of said three blades.

* * * * *